INVENTOR.
ROBERT A. HUNT
BY
ATTORNEY

Feb. 8, 1966  R. A. HUNT  3,234,359
RECORD CARD SCANNING APPARATUS
Original Filed Nov. 28, 1958  10 Sheets-Sheet 2

INVENTOR.
ROBERT A. HUNT
BY
ATTORNEY

Feb. 8, 1966

R. A. HUNT 3,234,359

RECORD CARD SCANNING APPARATUS

Original Filed Nov. 28, 1958

INVENTOR.
ROBERT A. HUNT
BY
ATTORNEY

Feb. 8, 1966   R. A. HUNT   3,234,359
RECORD CARD SCANNING APPARATUS

Original Filed Nov. 28, 1958   10 Sheets-Sheet 4

INVENTOR.
ROBERT A. HUNT
BY
ATTORNEY

INVENTOR.
ROBERT A. HUNT
BY
ATTORNEY

INVENTOR.
ROBERT A. HUNT
BY
ATTORNEY

Feb. 8, 1966 R. A. HUNT 3,234,359
RECORD CARD SCANNING APPARATUS
Original Filed Nov. 28, 1958 10 Sheets-Sheet 7
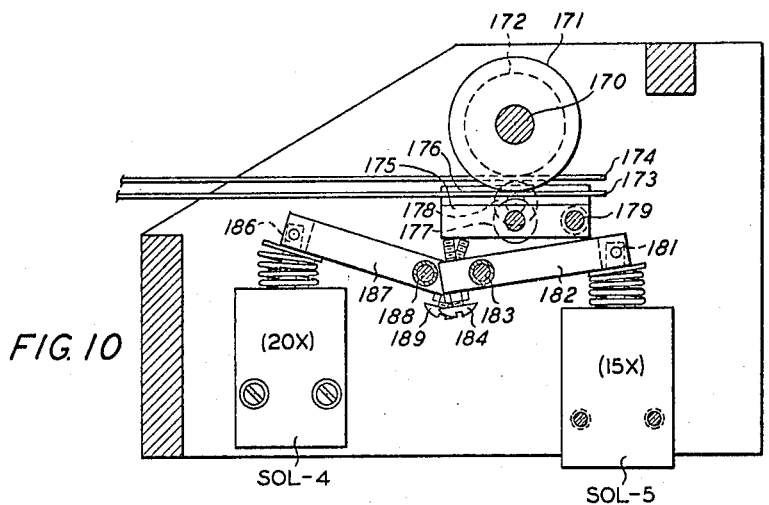
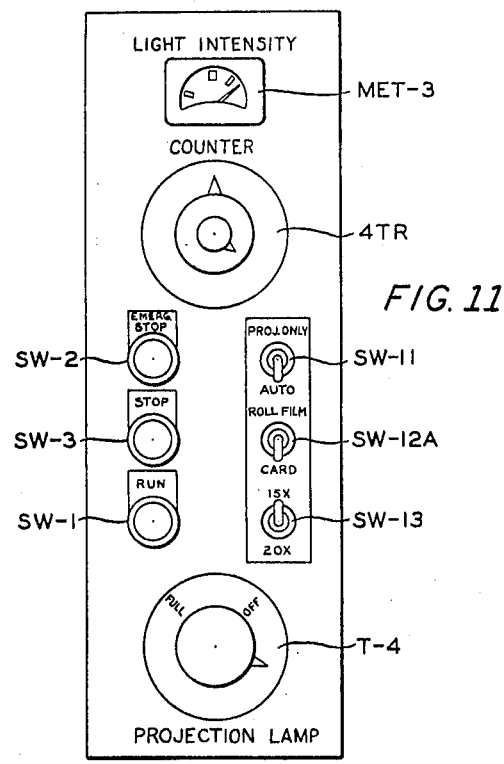
INVENTOR.
ROBERT A. HUNT
BY
ATTORNEY

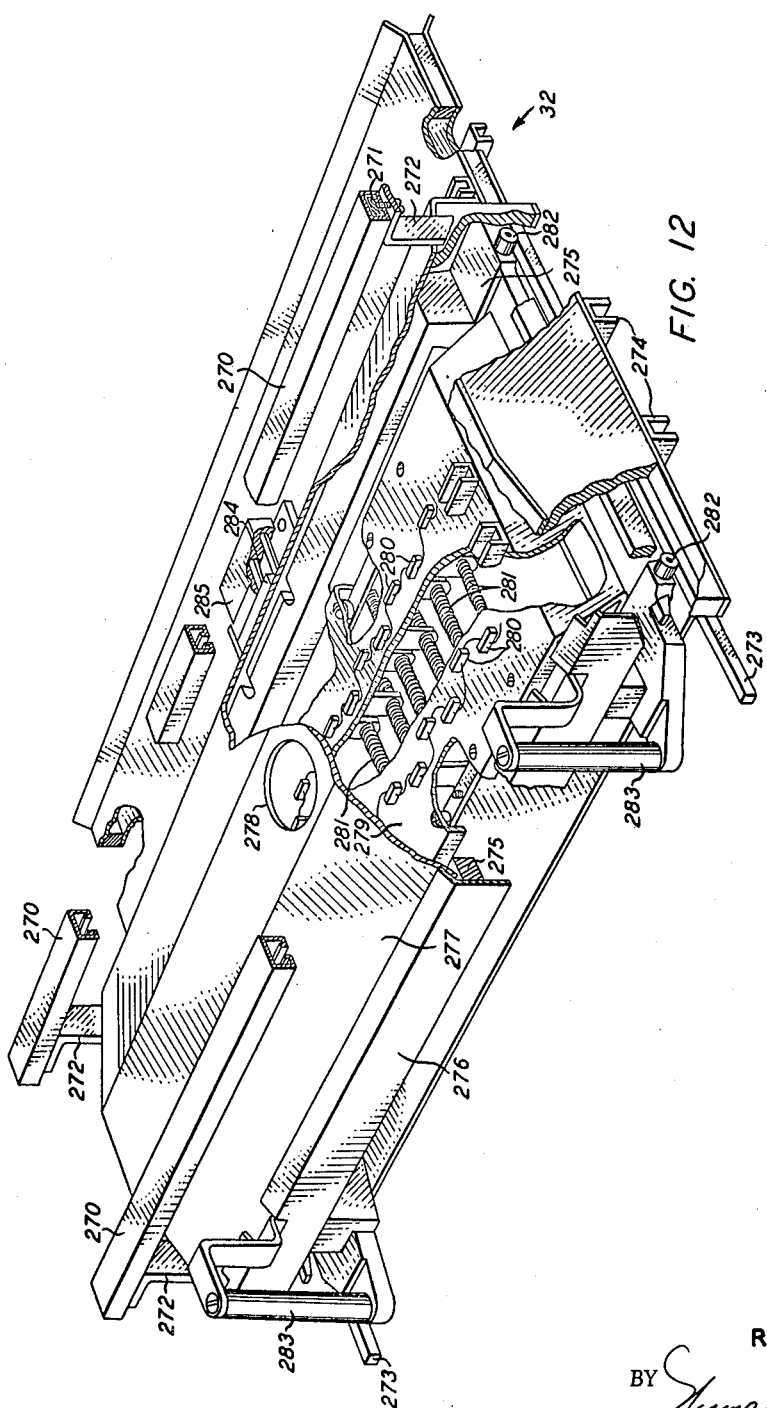

Feb. 8, 1966  R. A. HUNT  3,234,359
RECORD CARD SCANNING APPARATUS
Original Filed Nov. 28, 1958  10 Sheets-Sheet 9

INVENTOR.
ROBERT A. HUNT
BY
ATTORNEY

United States Patent Office 3,234,359
Patented Feb. 8, 1966

3,234,359
RECORD CARD SCANNING APPARATUS
Robert A. Hunt, Wilbraham, Mass., assignor to Xerox Corporation, Rochester, N.Y., a corporation of New York
Original application Nov. 28, 1958, Ser. No. 776,848. Divided and this application Dec. 14, 1961, Ser. No. 159,268
3 Claims. (Cl. 235—61.11)

This application is a division of the application of Hunt, Serial No. 776,848, filed November 28, 1958, now abandoned.

This invention relates to improvements in automatic xerographic reproduction systems and, particularly, to improvements in systems of this type to facilitate the making of reproductions from microfilm.

In the process of xerography, for example, as disclosed in Carlson Patent 2,297,691, issued October 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the light intensity that reaches them, and thereby creates an electrostatic latent image on or in the photoconductive layer. Development of the latent image is effected with an electrostatically charged, finely divided material, such as an electroscopic powder, which is brought into surface contact with the photoconductive layer and is held thereon electrostatically in a xerographic powder image pattern corresponding to the electrostatic latent image. Thereafter, the developed xerographic powder image is usually transferred to a support surface to which it may be fixed by any suitable means.

Since the disclosure in Carlson, many improvements have been made in xerographic devices and techniques, within the scope of the basic Carlson invention. As a result, both manual and automatic machines for carrying out xerographic reproduction processes are in wide commercial use. The present invention constitutes a further improvement in automatic xerographic processing systems whereby such systems may more readily be employed in integrating data processing systems, particularly those known as unitized data processing systems.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem, the mere protection of the records of a business may be considered. As a safeguard against destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent first, since the primary purpose was to remove the microfilm records from everyday use and, second, because of the relative inaccessibility of selected records contained on such microfilm.

Recently, there has been developed an improved system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon.

A typical example of a microfilm card of the type contemplated herein is disclosed in Patents 2,511,859, 2,512,106, and 2,587,022. As disclosed in these patents the microfilm card comprises a conventional record card of the type widely used in record-controlled accounting and tabulating systems, but is provided with an aperture with a depressed margin therein in which a microfilm frame may be inserted and permanently secured to the card. When a microfilm frame of data to be reproduced is so mounted in a microfilm card, the card may also be code punched with information defining, identifying, or relating to the microfilm picture. Thereafter, these cards may be manually or machine sorted and otherwise processed in accordance with conventional uses of such cards.

By the use of such "unitized" microfilm cards, it has been possible to effect substantial savings in the handling of microfilmed records. However, from the standpoint of reproduction of the card information, microfilm systems employing such cards were limited to conventional photographic projection techniques to reproduce the microfilm information. This involved cumbersome, costly, and time-consuming photographic developing techniques that detracted substantially from the overall efficiency of the system.

By means of the present invention it is possible to reproduce information from microfilm cards conveniently, economically, and at a rate of speed that contributes substantially to the utility and effectiveness of unitized microfilm systems. This is effected by means of an improved automatic xerographic processing system wherein microfilm cards may be fed seriatim to an optical scanning system and have their images projected onto the sensitized surface of a rotating xerographic drum after which an enlarged reproduction of the microfilm image is quickly and accurately transferred to a desired support surface.

The principal object of the invention is to improve automatic xerographic processing systems for use in unitized data processing systems. A further object of the invention is to improve automatic xerographic processing systems to facilitate the reproduction of copy from microfilm, particularly from microfilm cards. A further object of the invention is to improve card handling apparatus to enable compatible operation of microfilm cards with xerographic processing systems. A further object of the invention is to improve web feeding and tensioning apparatus to effect synchronism of movement between a moving web of transfer material and a rotating xerographic drum. A further object of the invention is to improve xerographic developing systems to effect more uniform and consistent development of electrostatic latent images on a xerographic plate. A further object of the invention is to improve card handling apparatus to enable compatible operation of microfilm cards with xerographic processing systems, independently of the longitudinal dimension of the microfilm frame in the card. A further object of the invention is to improve fusing apparatus for fixing xerographic powder images to support surfaces.

These and other objects of the invention are attained by means of an improved xerographic processing system that is provided with card handling apparatus for feeding microfilm cards seriatim to a card carriage whereby they are transported past the optical axis of a projection system in timed relation to the movement of a sensitized xerographic plate whereby the image on the microfilm is effective to form an electrostatic latent image on the xerographic plate in an enlarged configuration of the microfilm image. Thereafter, the electrostatic latent image is developed by means of an improved cascade developing system to form a xerographic powder image of the microfilm image on the drum. In addition, a web feeding and tensioning device is arranged to present a web of transfer material into surface contact with the xerographic plate and the electrostatic force developed in the transfer of the xerographic powder image to the transfer material is effective electrostatically to tack the transfer material web to the plate surface to ensure synchronism of movement therewith. After image transfer, the transfer material web is passed through an improved fusing apparatus wherein the xerographic powder image is permanently affixed to the web. The invention also includes means for controlling the operation of the card handling apparatus whereby a predetermined number of reproductions of each microfilm card may be made, as required. Furthermore, the card handling apparatus may be positioned relative to the axis of the optical system, as desired, whereby microfilm cards having different longitudinal dimensions may be processed without loss of time or waste of material.

A preferred form of the invention is shown in the accompanying drawings in which:

FIG. 3 is a side elevation, partly in section, of the card handling apparatus of the invention;

Figure 1:
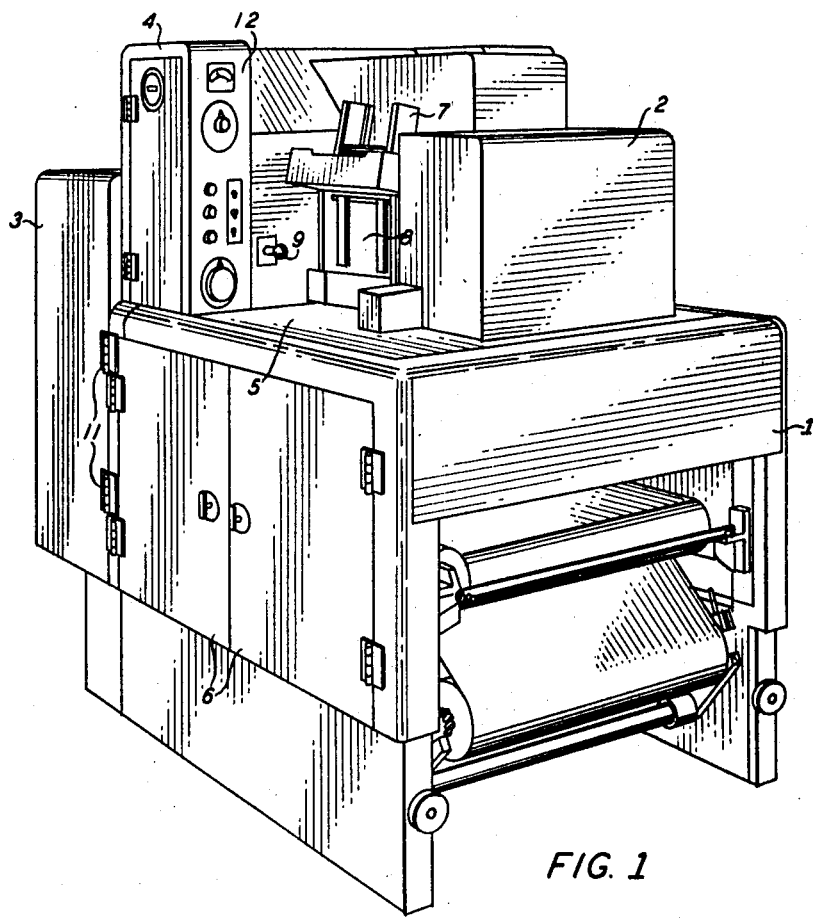
FIG. 1 is a perspective view of an automatic xerographic processing system embodying the invention.
Figure 7:
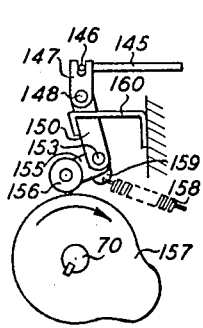
Figure 8:
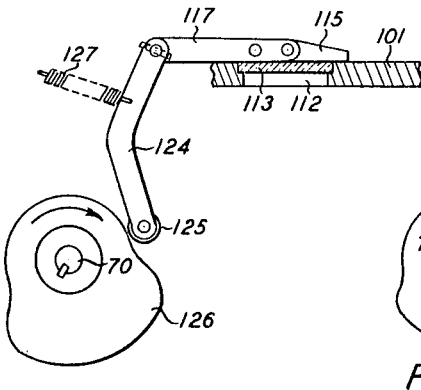
Figure 9:
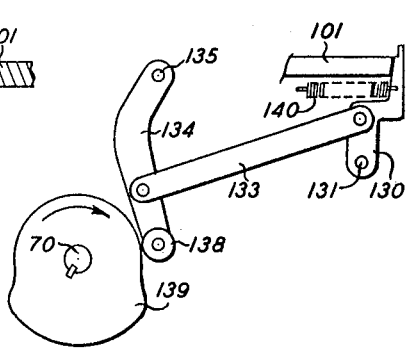
Figure 13:
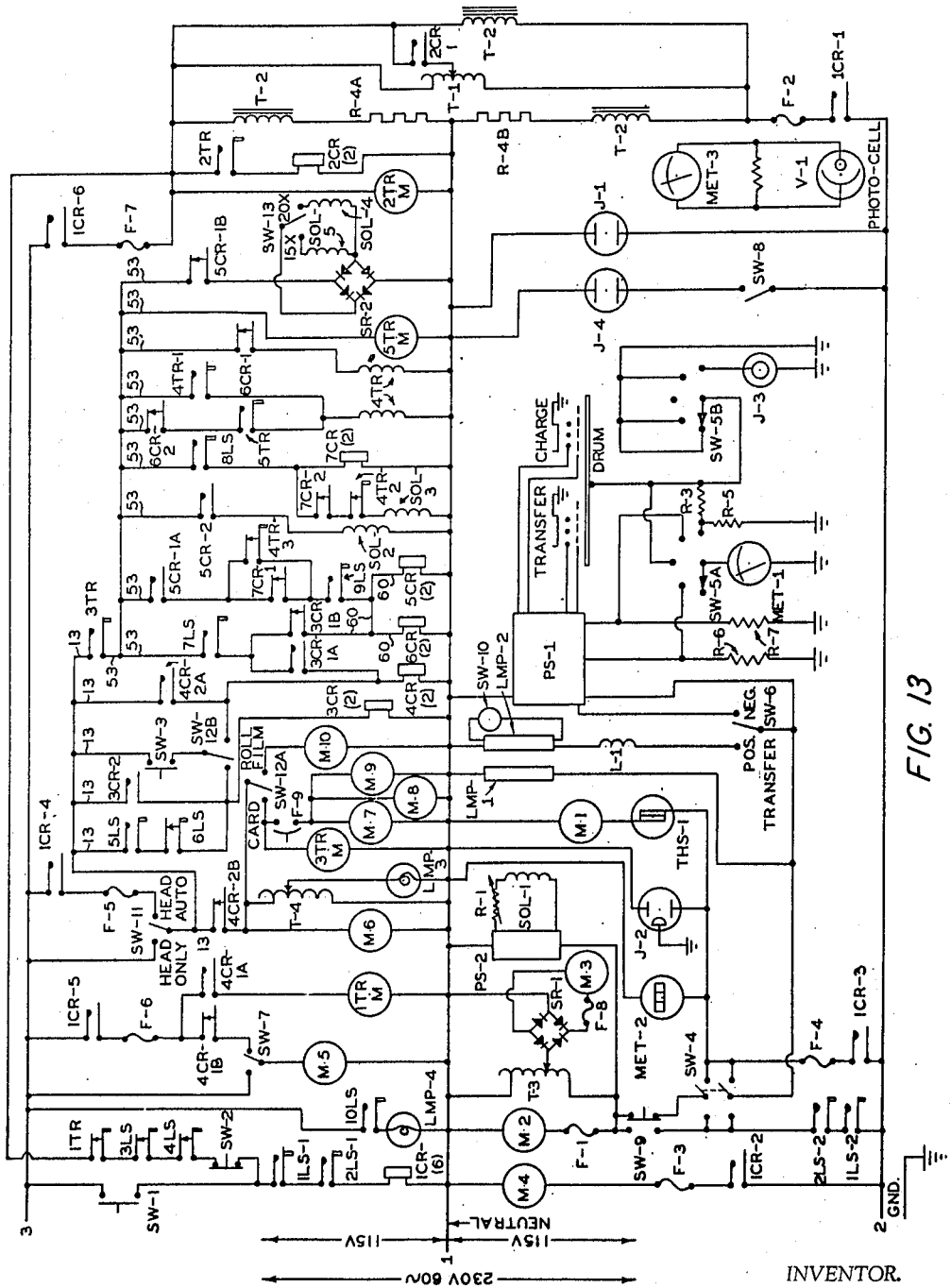

FIGS. 7, 8, and 9 are schematic sectional elevations, respectively, of the card ejecting, card holding, and card guiding mechanisms of the card handling apparatus;

FIG. 10 is a sectional view of the card carriage drive mechanism;

FIG. 11 is an enlarged elevation of the control panel of the xerographic processing system of FIG. 1;

FIG. 12 is an isometric view of the fusing apparatus;

FIG. 13 is a wiring diagram; and

Figure 14:
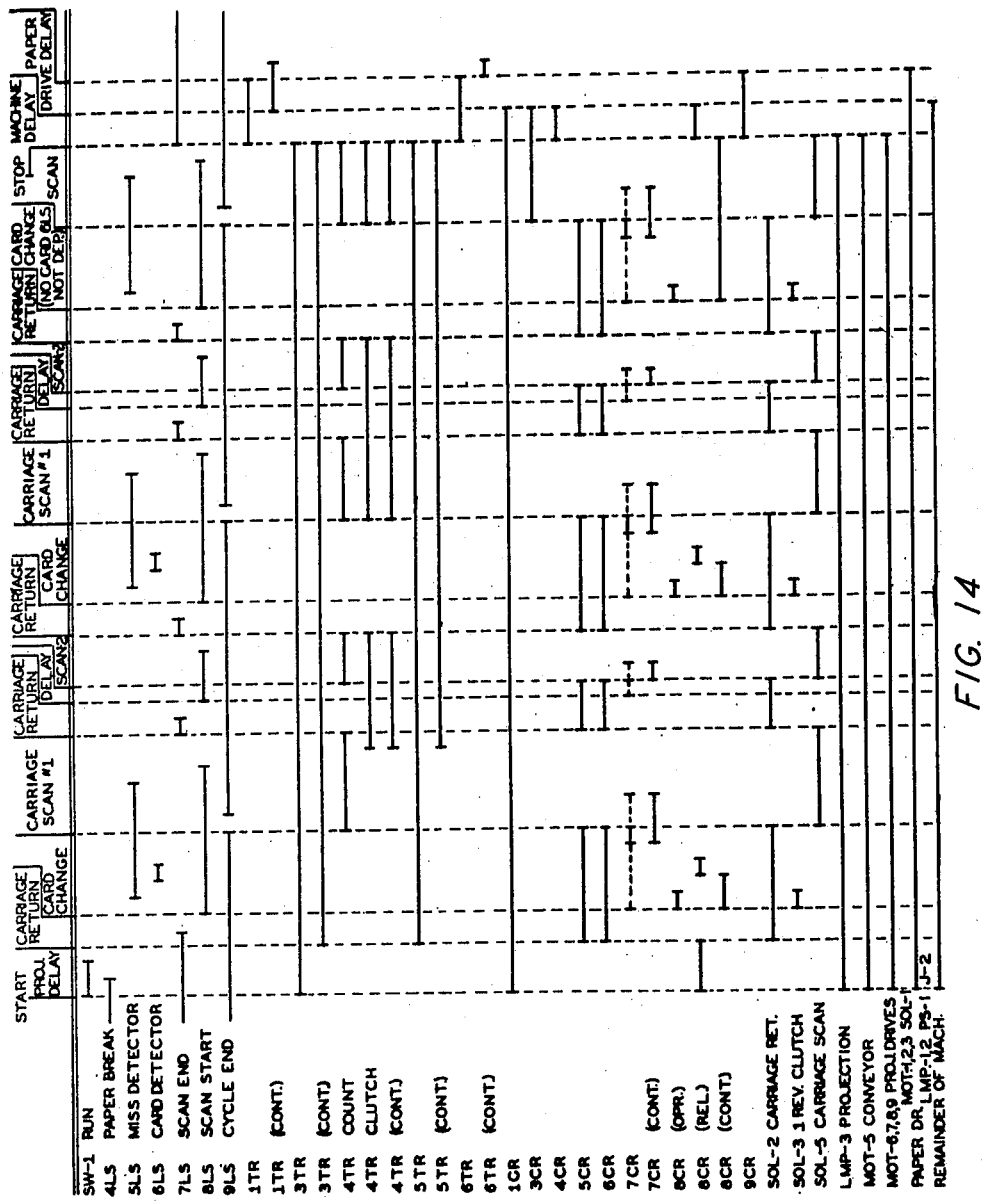

FIG. 14 is a timing diagram.

Throughout this description the front of the xerographic processing system (see FIG. 1) is regarded as that portion which the operator faces while placing microfilm cards in the machine for reproduction and while adjusting the several manual operating controls. The right and left ends of the machine are regarded as being to the right and left of the operator as he faces the machine.

In the particular embodiment shown in the drawings, the invention is incorporated in a microfilm projection system that is a fully automatic, continuous printer for reproducing information contained on microfilm cards. This equipment reproduces copy on a continuous roll of paper, that may have a web width up to 24", from either positive or negative film, in either of two magnification ratios: 15× or 20×; whereby microfilm images of different sizes may conveniently be enlarged to the full width of the web. Referring to FIG. 1, the system may be considered to include four distinct sections for housing the several elements thereof, namely, a base section 1, for housing the xerographic drum, the web tensioning and feeding apparatus, as well as the devices for effecting the xerographic functions of plate charging, image transfer, brush cleaning, etc.; an upper section 2, for housing the card handling apparatus as well as the bulk of the optical system; an end section 3, secured to the left end of the base section, for housing the xerographic developing apparatus; and a control section 4, mounted on the base section and forward of the upper section, for housing certain of the electrical equipment required in the system and to provide a control panel whereon the operator may set selected ones of a plurality of switches for selecting the desired type of operation.

Base section 1 includes two side frames that are connected across their tops by a plate 5, whereby the entire system is supported. Suitable cover plates are included to enclose the mechanism and access doors are provided on the front of the machine to facilitate repair and adjustment. Upper section 2 includes suitable cover plates for enclosing the bulk of the card handling apparatus and the optical system, as well as a card magazine 7 for holding microfilm cards from which reproductions are to be made, and a receiving magazine 8 to which cards are ejected after the microfilm image thereon is reproduced. Also included, is a lever 9 whereby the optical system may be set selectively for 15× or 20× magnification ratio. In addition, a handwheel is provided whereby the position of the card magazine may be altered relative to the optical system, in accordance with the longitudinal dimension of the image on the microfilm card. End section 3 is enclosed by a dust-tight housing and is pivotally mounted on the base section by suitable hinges 11, whereby the entire end section of the machine may be swung outwardly to permit access to the several elements of the developing system, and to permit convenient access to the surface of the xerographic drum for the purpose of cleaning. The entire structure is specifically arranged to form a light-tight enclosure in the areas of the optical projection system and the xerographic developing system.

Control section 4 (see also FIG. 11) includes an instrument panel 12 for supporting the several operating controls in convenient reach of the operator. These controls include a variable transformer control T–4, for varying the intensity of the projection lamp of the optical system; a light intensity meter MET–3, which is employed in testing to determine the light intensity reaching the xerographic drum; and an automatic reset-type counter 4–TR, that is pre-settable to the desired number of copies required to be made of any microfilm card image. In addition, the panel includes a "Run" switch SW–1, to initiate the operation of the system; a "Stop" switch SW–3, that functions to stop the machine within a predetermined interval after it is pushed to permit the completion of certain xerographic operations; and an "Emergency Stop" switch SW–2, that is effective to stop the system instantaneously in the event this should become necessary. Also included are switches for selecting the desired type of operation, as follows: A "Projection Only—Automatic" switch SW–11, whereby the entire machine may be run automatically or the upper section or "head" may be operated independently; a "15×–20×" switch SW–13, for selecting the driving rate of the microfilm card carriage; and a "Card-Roll Film" switch SW–12A, whereby the machine may be set to operate from microfilm cards or from roll film, if desired. It may be noted that an understanding of machine operation with roll film is not essential to the present invention and that, therefore, no portion of the roll film mechanism is described herein.

*General description of system (FIG. 2)*

Figure 2:
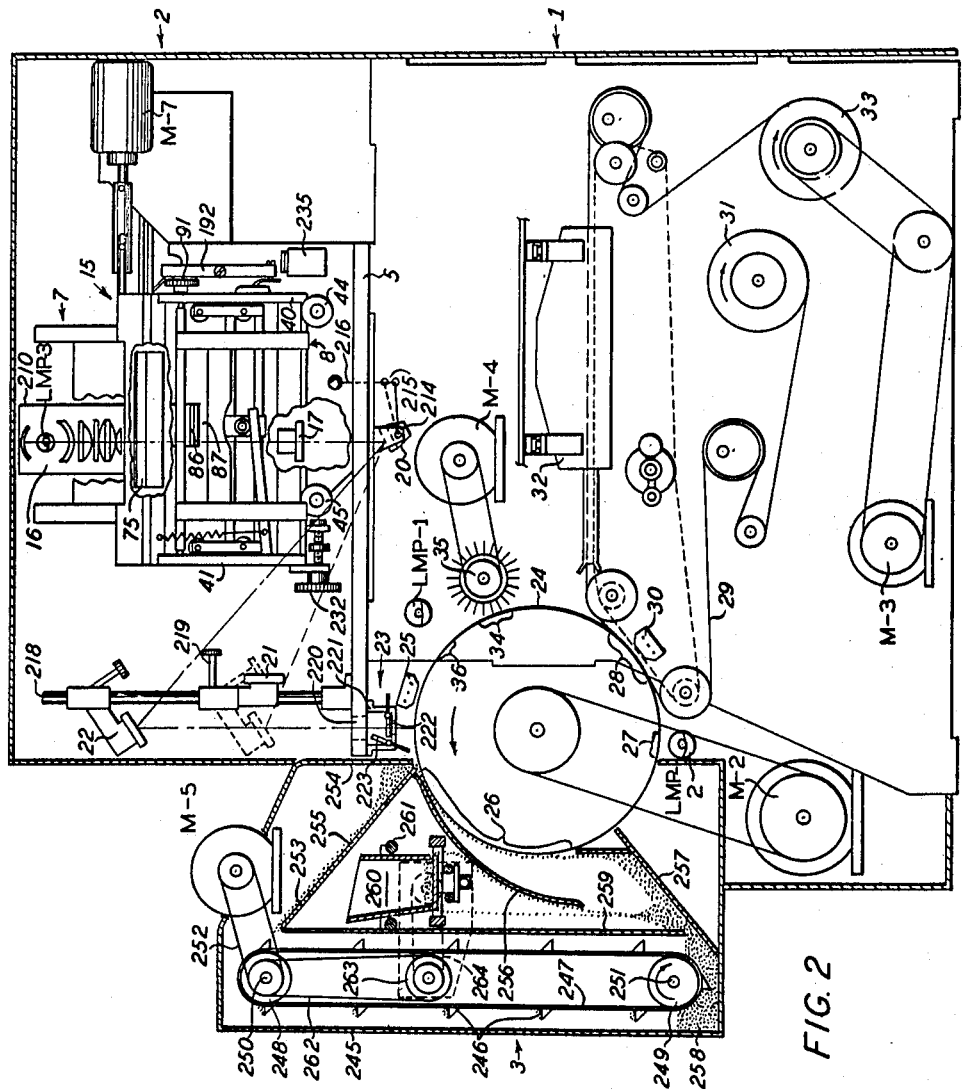
FIG. 2 is a schematic sectional view of the apparatus of the invention.

For a general understanding of the xerographic processing system in which the invention is incorporated, reference is had to FIG. 2 in which the various system components are schematically illustrated. As in all xerographic systems based on the concept disclosed in the above-cited Carlson patent, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by any suitable form of fusing device, whereby the powder image is caused permanently to adhere to the support surface.

In the system disclosed herein, microfilm cards are placed in a card magazine 7 from which they are fed seriatim to a card carriage of a card handling apparatus, generally designated by reference character 15, arranged to the rear of the card magazine assembly. Suitable driving means are provided for the card carriage whereby it is caused to move the card past the optical axis of a projection lens system 16 that is illuminated by a projection lamp LMP-3 for the purpose of scanning the microfilm frame. The microfilm card image is projected downwardly through an adjustable objective lens assembly 17 and then reflected upwardly by an adjustable mirror element 20 to either of two transverse mirror assemblies 21 or 22, in order to vary the length of the optical path, depending on the magnification ratio employed. From mirror assemblies 21 or 22, the light image is projected downwardly through a variable slit aperture assembly 23 and onto the surface of a xerographic plate in the form of a drum 24.

Xerographic drum 24 includes a cylindrical member mounted in suitable bearings in the frame of the machine and is driven in a counterclockwise direction by a motor M-2 at a constant rate that is proportional to the scan rate of the microfilm card, whereby the peripheral rate of the drum surface is identical to the rate of movement of the reflected light image. The drum surface comprises a layer of photoconductive material on a conductive backing that is sensitized prior to exposure by means of a screened corona generating device 25, which may be of the type disclosed in Walkup Patent 2,777,957, that is energized from a suitable high potential source.

The exposure of the drum to the light image discharges the photoconductive layer in the areas struck by light, whereby there remains on the drum a latent electrostatic image in image configuration corresponding to the light image projected from the microfilm card. As the drum surface continues its movement, the electrostatic latent image passes through a developing station 26 in which a two-component developing material, which may be of the type disclosed in Walkup Patent 2,638,416, is cascaded over the drum surface.

After developing, the xerographic powder image passes a discharge station 27 at which the drum surface is illuminated by a lamp LMP-2, whereby residual charges on the non-image areas of the drum surface are completely discharged. Thereafter, the powder image passes through an image transfer station 28 at which the powder image is electrostatically transferred to a support surface web 29 by means of a second corona generating device 30 similar to corona charging device 25, mentioned above.

The support surface to which the powder image is transferred may be of any convenient type and is obtained from a supply roll 31 and is fed over suitable guide and tensioning rolls and directed into surface contact with the drum in the immediate vicinity of transfer corona generating device 30. After transfer, the support surface is separated from the drum surface and guided through a suitable heat fusing apparatus 32, whereby the powder image is permanently affixed to the support surface. Thereafter, the support surface is fed over a further system of guide and tensioning rolls and onto a take-up roll 33 that is driven by motor M-3.

After transfer, the xerographic drum surface passes through a cleaning station 34 at which its surface is brushed by a cleaning brush assembly 35, rotated by a motor M-4, whereby any residual developing material remaining on the drum is removed. Thereafter, the drum surface passes through a second discharge station 36 at which it is illuminated by a fluorescent lamp LMP-1, whereby the drum surface in this region is completely flooded with light to remove any electrostatic charge that may remain thereon. Suitable light traps are provided in the system to prevent any light rays from reaching the drum surface, other than the projected microfilm image, during the period of drum travel immediately prior to sensitization by corona generating device 25 until after the drum surface is completely passed through the developing station 26.

*Cards feeding apparatus (FIGS. 3, 4 and 5)*

The card feeding apparatus comprises the several devices that serve to feed microfilm cards seriatim from card magazine 7 (see FIG. 3) to a card carriage whereby they are moved past an optical system that is effective to project the microfilm image onto the xerographic drum one or more times, in accordance with the number of copies required. After projection of the required number of light images, the card is ejected from the card carriage and is deposited in receiving magazine 8.

Figure 4:
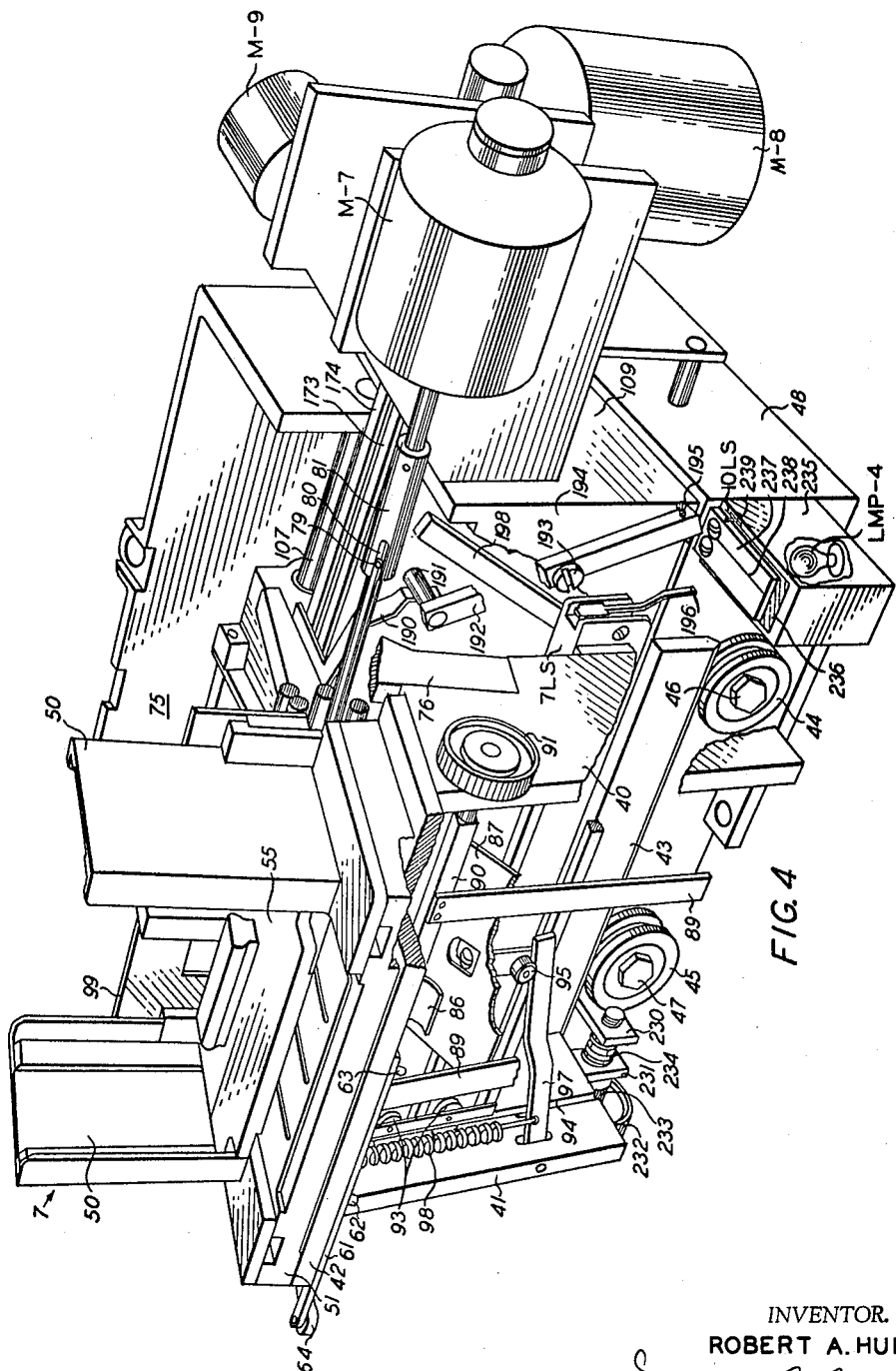
FIG. 4 is a perspective view of the card handling apparatus, as seen from the front of the machine.

For convenience of assembly and adjustment, the card feeding apparatus, as shown in FIG. 4, is mounted on a rigid frame consisting of side plates 40 and 41 and a top plate 42 that is integrally connected with the side plates. Side plates 40 and 41 are also connected at their lower ends by a knife edge member 43 that rides in grooves in rollers 44 and 45 that are rotatably mounted on studs 46 and 47 that are fixed in a base casting 48 that serves to support the entire card handling apparatus and, in turn, is supported on plate 5 of base section 1. By this arrangement the entire weight of the card feeding apparatus is supported by rollers 44 and 45, whereby the entire assembly may be moved laterally, as described below, to adjust the position of the card magazine assembly relative to the card carriage. Suitable guide members (not shown) are provided to maintain the card feeding apparatus in upright position.

Seriatim feeding of the cards is effected by means of an apparatus that is an adaptation of that disclosed in Braun Patent 2,211,094. Microfilm cards are placed in card magazine assembly 7 that includes vertical guide members 50 for holding a stack of cards in alignment, and a base member 51 for supporting the weight of the card stack which, in turn, is supported on frame plate 42. The magazine is arranged to permit the feeding of cards from the bottom of the card stack and an adjustable throat knife assembly 52 is provided at the exit slot 54 of the magazine to retain the remaining cards in the stack as each bottom card is removed. A card weight 55 is provided to hold the cards in proper feeding relation.

For moving each card out of the magazine, the apparatus includes a movable base block 56 that supports the trailing edge of the card stack and is provided with an adjustable pickerknife 57 that is arranged to engage the trailing edge of the lowermost card of the stack. Base block 56 is mounted in suitable ways for sliding movement toward and away from the exit slot of the magazine, and is reciprocated in timed relation to the operation of the remainder of the card handling apparatus. For this purpose, a lever 61 is pivotally mounted on a stud 62 fixed in frame plate 42 and is connected to base block 56 by a shouldered screw 63. The other end of lever 61 is connected to a crank rod 64 which, in turn, is pivotally connected to a crank arm 65 that is adjustably mounted on a detent cam 66 keyed on a cam shaft 70 (see also FIG. 5). As described below, cam shaft 70 is rotated periodically through a single revolution clutch, in timed relation to the remainder of the mechanism, whereby a single card is advanced from card magazine 7, as required.

As each card leaves magazine 7, it is gripped sucessively by two sets of feed rolls 71 and 72 and advanced rearwardly to a card carriage assembly, generally designated by reference character 75. For this purpose, both sets of feed rolls 71 and 72 are journaled for rotation in supporting brackets 76 and 77 that are secured on side plates 40 and 41, respectively, and the upper rolls are resiliently urged into engagement with the lower rolls by springs 78. For driving the feed rolls, the shaft of lower roll 71 extends through bracket 76 and is provided with a pin 79 that engages a slot 80 in a collar 81 fixed on the drive shaft of a motor M–7 that rotates continuously while the apparatus is in operation. The remaining rolls are positively driven through pinions 82 fixed on each feed roll shaft and an idler pinion 83 mounted on bracket 77, whereby the two upper rolls 71 and 72 are rotated clockwise, as viewed in FIGS. 3 and 5, and lower rolls 71 and 72 are rotated counterclockwise to advance the card to card carriage assembly 75, which at this point of operation is directly aligned with the feed rolls to receive the card.

Immediately thereafter, the card carriage is moved to the right, in a path of movement normal to the card feeding movement, to effect the image scanning operation. After the microfilm image in the card is scanned by the optical system, carriage assembly 75 is returned to a position in alignment with the feed rolls and the card is ejected from the carriage assembly, as described below. Thereupon it is engaged by lower feed roll 72 that is in frictional contact with an idler feed roll 84 that is rotatably mounted in arms 85, that are pivoted on side plates 40 and 41, and is resiliently urged into contact with feed roll 72. The continued driving action of feed roll 72 is thereby effective to move the card forwardly against a deflector plate 86 that causes the card to drop downwardly and come to rest on a support plate 87 in receiving magazine 8.

The receiving magazine includes suitable vertical guide members 88 to confine the movement of the cards, rearwardly, and gate members 89 are fixed on a rod 90 that is rotatably mounted in side plates 40 and 41. Gate members 89 are effective to maintain the cards in a vertical stack but may conveniently be swung outwardly by rotating a knob 91 fixed on rod 90, whereby the operator may remove cards from the machine. Support plate 87 of the magazine is secured on a rectangular frame assembly 92 having rollers 93 that ride in vertical grooves 94 in side plates 40 and 41, whereby support plate 87 is guided or vertical movement. A roller 95 is mounted on a stud 96 fixed in frame assembly 92 and rides on a lever 97 that is pivotally mounted in side plate 41. Spring 98 is extended between lever 97 and the magazine frame to urge frame assembly 92 and support plate 87 upwardly, when there are no cards in the magazine. This construction minimizes the possibility of cards tumbling as they are ejected from the card carriage and, at the same time, provides a support plate structure that moves downwardly as additional cards are added, against the tension of spring 98, whereby a substantial number of cards may be stacked in the receiving magazine before it is necessary for the operator to remove them.

In the event of a misfeed of a card or in the event the supply of cards in card magazine 7 becomes exhausted, means are provided to stop the machine to enable the operator to make the necessary adjustments. For this purpose, a "card detector switch" 6–LS (see FIG. 5) is mounted on the back plate 99 of card magazine 7. This switch functions in conjunction with the remainder of the electrical circuit to keep the several operating circuits energized as long as switch 6–LS is actuated during the period in which a card is supposed to be passed through feed rolls 71 and 72. For this purpose, a switch-actuating element 100 extends downwardly between the upper feed rolls 71 and 72 and into the path of movement of the cards. Engagement of each card with actuating element 100 serves to maintain the desired circuitry energized. In the event there is a failure to feed a card, switch 6–LS is not actuated and the circuit is thereby broken to stop the machine, as described below.

*Card carriage assembly and controls*
*(FIGS. 3, 5 and 6)*

The card carriage assembly receives each microfilm card from the feed rolls and carries it through the scanning cycle, i.e., the "scan" or exposure stroke and the return stroke, during continuous operation of the machine. In the normal stopping position of the system, the card carriage 75 is positioned at the end of its scan stroke of movement, in which it is out of register with the card magazine assembly 7. When the system is restarted, card carriage 75 is immediately returned to a position in register with feed rolls 71 and 72 of the card magazine assembly to receive the next card for reproduction. The carriage is held momentarily in this position to permit the ejection of a card carried thereby, if any, and to receive a new card. During the scanning cycle and the card changing cycle, the card carriage and its several related operating mechanisms function to effect the several mechanical movements and electrical circuit connections of the card handling operation in proper sequence.

Specifically, card carriage assembly 75 includes a card carriage 101 (see FIGS. 5 and 6) that is formed of a casting having a flat top surface or platen for supporting cards and a longitudinal bore 102 extending through two downwardly depending bosses 103 and 104 in which are inserted linear ball bushings 105 and 106 whereby the carriage is adapted for lateral movement, relative to the card magazine assembly, on a shaft 107 that is fixed in frame plates 108 and 109 secured on base plate 48. To maintain the carriage horizontal, it is provided with a roller (not shown) that is mounted on its underside at an axis at right angles to shaft 107 and that rides on a rail (not shown) that is arranged parallel to shaft 107. By this structure, carriage 101 is supported for movement on shaft 107 while maintaining its card supporting surface in a substantially horizontal position throughout its path of movement.

For guiding microfilm cards onto the carriage platen, card guides 110 and 111 are provided at opposite ends of the carriage. In order to project a light image from a microfilm card supported on the carriage, a rectangular aperture 112 (see FIG. 3) is formed through carriage 101. Aperture 112 is of a dimension slightly in excess of that of a microfilm frame held in a card, and is positioned to underlie the microfilm frame when the card is positioned on the carriage. An optical glass insert 113 is positioned in aperture 112 to provide a flat surface for supporting the microfilm frame.

For clamping the microfilm frame of a card in scanning position, there is provided a spring loaded, rectangular frame or pressure pad 115 (see FIG. 6) having an optical flat 116 secured therein and projecting slightly from the underside thereof, whereby, when frame 115 is positioned on a card held on the carriage, optical flat 116 securely presses the microfilm frame against insert 113 in the carriage so that the microfilm frame is securely pressed in a horizontal plane during the scanning operation.

In order to actuate pressure pad 115 to permit the insertion and removal of microfilm cards, the pad is fixed to two arms 117 and 118 that are pinned on a shaft 119 that is rotatably journaled in bosses 120 and 121 on carriage 101. Also fixed on shaft 119 is another arm 122 that is connected by a bail rod 123 to arm 118, whereby the remaining portion of the card is held substantially flat on the carriage.

For operating pressure pad 115, a crank 124 (see also FIG. 8) is fixed on shaft 119 and is provided with a follower 125 at its lower end that is adapted to be engaged by the high dwell of a cam 126 fixed on cam shaft 70 which, as described below, is rotated through a single revolution by means of a single revolution clutch drive during each card feeding operation. The rigid crank assembly comprising pressure pad 115, arms 117 and 118, and crank 124 are resiliently urged clockwise by a spring 127 extended between crank 124 and the outer edge of a bracket 128 fixed on boss 121. The several parts of this assembly are so proportioned that they are limited in motion by contact between pad 115 and the carriage surface so that follower 125 is held slightly away from the low dwell of cam 126 at this stage of operation.

For properly positioning a card on carriage 101 after it is fed thereto, the apparatus includes two line-up fingers 130 (see also FIG. 9), together with their actuating linkages. Each of the fingers 130 is in the form of an offset lever that is pivotally mounted on a stud 131 secured in a boss 132 on the underside of the carriage. A forked link 133 connects the midportion of each finger 130 to a follower arm 134 that is pivotally mounted on a stud 135 journaled in bosses 136 and 137 formed on the carriage. A follower 138 is rotatably mounted on the lower end of lever 134 and is adapted to engage the high dwell of a cam 139 that is also fixed on cam shaft 70. A spring 140 is extended between a stud 141 and the upper portion of each finger 130 and functions to urge each finger against the forward edge of carriage 101 and to urge follower 138 into contact with cam 139. However, the dimensions of the parts are such that contact between the fingers and the carriage limits the rearward movement of follower 138 to a position in which a slight clearance is maintained between it and the lower dwell of cam 139. In operation, fingers 130 are rocked clockwise (in FIG. 9) immediately prior to the time a card is fed from feed rolls 72 so that the card has unimpeded passageway onto the card carriage. The high dwell of cam 139 is such that when a card is completely passed over fingers 130, the fingers are restored to the position shown by spring 140 and serve to urge the card rearwardly to place it accurately in scanning position.

For ejecting a card during a card changing cycle, two ejector rods 145 (see also FIG. 7) are slidably journaled in bores drilled through bosses 120 and 121 and extending for a slight distance onto the upper surface of carriage 101. Ejector rods 145 are normally held in their rearward position, as in FIG. 6, and are provided with squared forward ends that engage the rearward edge of a card positioned on the carriage. The rearward ends of rods 145 are connected to a transverse rod 146 that extends between the arms of a bifurcated crank 147 that is fixed on a rod 148 which, in turn, is fixed at each end to crank arms 149 and 150. Crank arm 149 is pivotally mounted on a stud 151 in a boss 152 on the carriage. Crank arm 150 is fixed on a stud shaft 153 that is journaled in bosses 154 on the carriage and is rigidly connected to a crank arm 155 having a follower roller 156 that is adapted to engage the high dwell of a card ejector cam 157 fixed on cam shaft 70. A spring 158, extended between the underside of boss 103 and a downward extension 159 on crank 150, serves to rotate the crank assembly counterclockwise to draw ejector rods 145 to their rearward position and to urge follower roller 156 against the low dwell of cam 157. However, a bracket 160 secured on the carriage limits the movement of the crank assembly to maintain follower roller 156 slightly out of contact with cam 157. When roller 156 is actuated by the high dwell of cam 157, the crank assembly is rocked clockwise to cause ejector rods 145 to eject a card from the carriage and into the ejector rolls of receiving magazine assembly 8.

For operating the several cam controlled mechanisms of card carriage assembly 75 as well as the card feeding mechanism, there is provided a motor M-8 that is supported by base casting 48 and is connected to cam shaft 70 through a gear reduction assembly 165 and a conventional solenoid actuated, single revolution clutch 166, whereby the several mechanisms are caused to function in timed relation to the remainder of the mechanism. Motor M-8 is driven continuously and is effective to drive cam shaft 70 through a single revolution upon the energization of a solenoid SOL-3, as described below. When this occurs it is apparent from the cam contours shown in FIGS. 7, 8 and 9 that line-up fingers 130 are first rocked clockwise to remove them from the path of movement of the card. Immediately thereafter, pressure pad 115 is elevated to release the card, if any, held on carriage 101. Thereupon ejector rods 145 are effective to eject the card from the magazine and are immediately withdrawn to their rearward positions. At this point, crank 65 is effective to cause a new card to be advanced through feed rolls 71 and 72, and onto the card carriage. Immediately thereafter, fingers 130 are rocked counterclockwise to position the card accurately on the carriage. As this is accomplished, pressure pad 115 is lowered to press the microfilm frame into register with the scanning aperture in the carriage. During the rotation of cam shaft 70, detent cam 66 is effective: first, at about its midpoint of revolution, to actuate a "miss detector" switch 5-LS that functions in conjunction with "card detector" switch 6-LS to stop the system in the event of a misfeed; and second, immediately before the end of its rotational movement, to actuate an "end of cycle" switch 9-LS that functions to condition the related circuts for a scanning cycle of operation, as described below.

*Card carriage drive (FIGS. 4, 5 and 10)*

For driving card carriage assembly 75 during the scanning operation, there is provided a driving arrangement for moving the carriage at different speeds during the "scan stroke," in accordance with the particular magnification ratio that is to be employed. For this purpose, there is provided a motor M-9 (see FIGS. 4 and 5) that is suitably secured in the frame of the machine and is provided with a drive shaft 170 having two rollers of different dimension fixed thereon, i.e., a roller 171 to effect 15× drive rate, and a roller 172 to effect 20× drive rate. Associated with rollers 171 and 172 are drive rods 173, 174, respectively, each of which is of substantially rectangular cross-section and is secured to the right-hand end of carriage assembly 75. In the arrangement employed, as illustrated in FIG. 10, each of the drive rods 173 and 174 is spaced slightly from its associated drive roller and rests on an associated pinch roller 177 and 178, respectively, each of which is mounted on a substantially horizontal bar member 175 and 176, respectively, that are pivotally mounted on a stud 179.

In operation, motor M-9 rotates continuously but is effective to drive carriage assembly 75 only at selected intervals because of the spacing betwen drive rods 173 and 174 and their respective drive rolls 171 and 172. To effect engagement of drive rod 171 and drive roll 173 there is provided a "15×" solenoid SOL-5 that is mounted in the frame of the machine and has its armature 181 connected to a lever 182 that is pivotally mounted on a stud 183 secured in the machine frame. At the opposite end of lever 182 there is provided an adjustable screw 184 that is set substantially in engagement with the lower face of bar 175. Similarly, there is provided a "20×" solenoid SOL-4 which, through its armature 186, actuates a lever 187 pivoted on a stud 188 and is provided with an adjustable screw 189 that contacts the lower face of bar 176.

When the machine is to be set for a 15× magnification ratio, the operator adjusts switch SW-13 (see FIG. 11) accordingly, whereby 15× solenoid SOL-5 is connected in the carriage assembly drive circuit. When the carriage is to be operated, solenoid SOL-5 is energized, as described below, to rotate lever 182 clockwise and drive bar 175 clockwise to cause roller 177 to force drive rod 173 into frictional engagement with drive roll 171. Similarly, when 20× magnification ratio is desired, 20× solenoid SOL–4 is energized to rotate lever 187 counterclockwise about pivot 188 and drive bar 176 clockwise to cause roller 178 to move drive rod 174 upwardly into frictional engagement with drive roll 172. By proper selection of the drive roll diameters, different driving ratios are obtained whereby, in each instance, carriage assembly 75 is driven past the axis of the optical system at a rate directly proportional to the rotational speed of the xerographic drum in order to achieve exact synchronism between the moving light image of the microfilm frame and the sensitized surface of the xerographic drum, in accordance with the magnification ratio desired.

Figure 5:
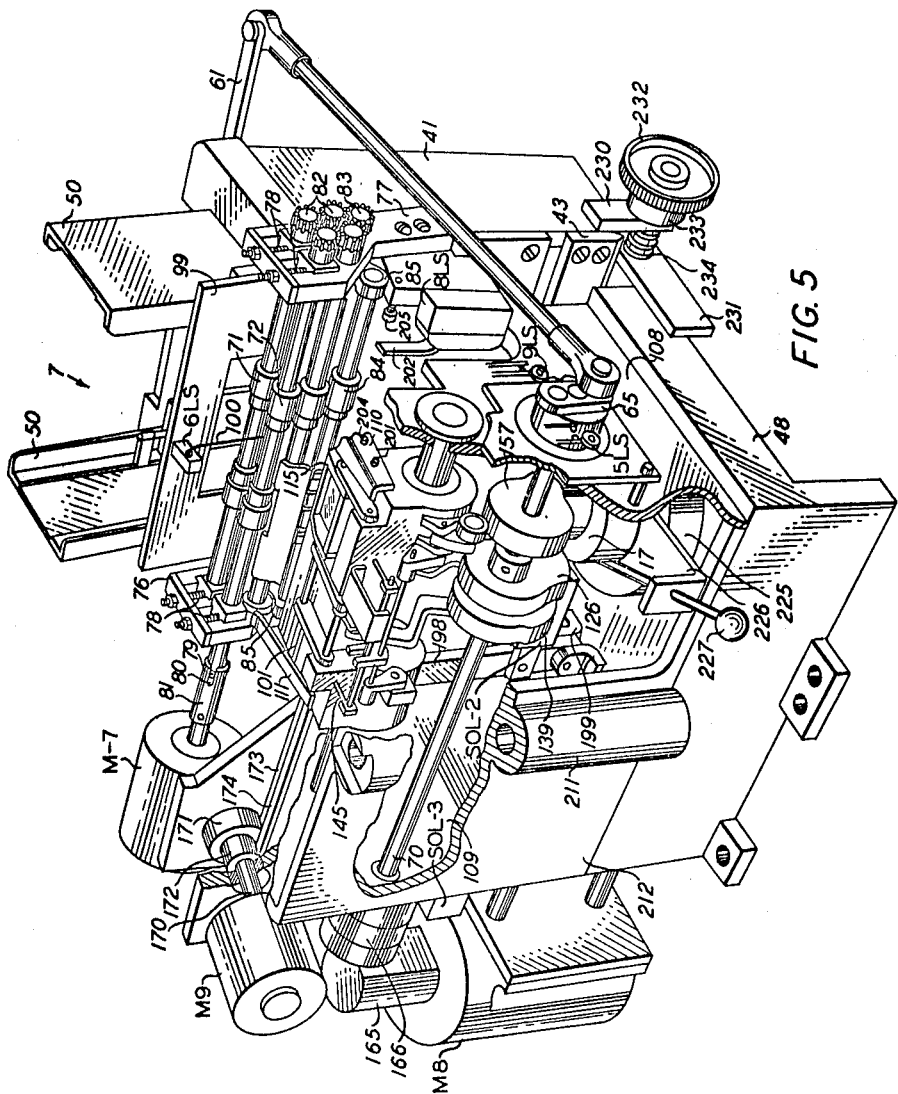
FIG. 5 is a perspective view of the card handling apparatus, as seen from the rear of the machine.
Figure 6:
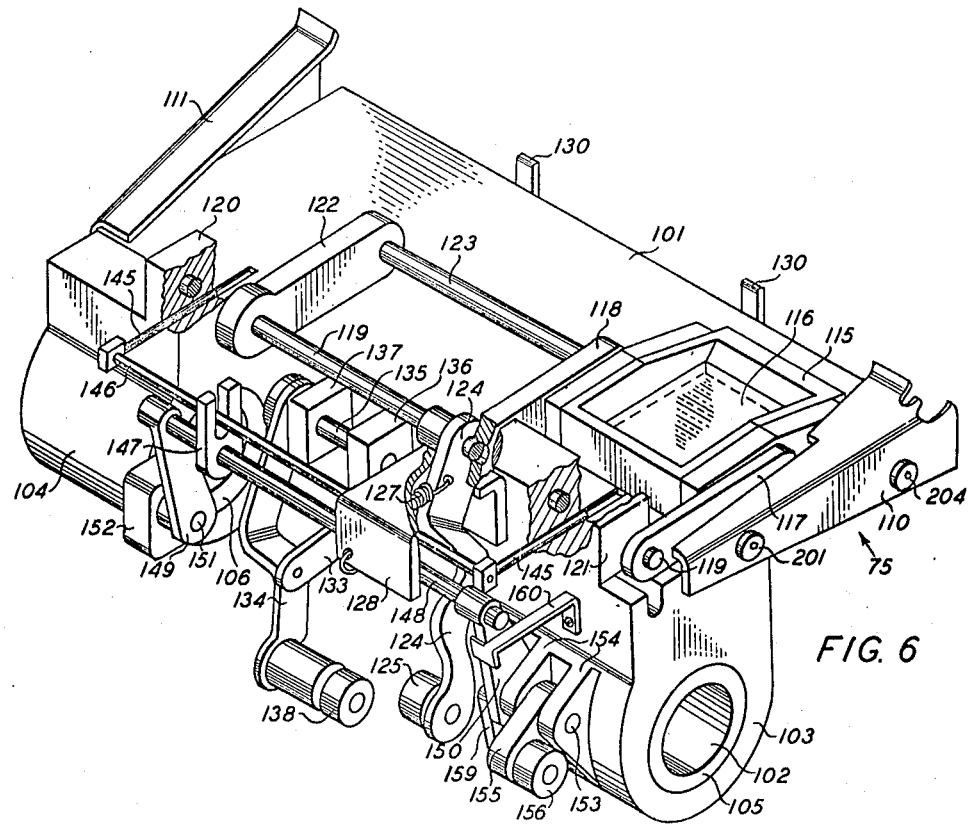
FIG. 6 is an isometric view of the card carriage.

For driving the card carriage during the return stroke of the scanning operation, there is provided a solenoid-actuated restoring mechanism to effect substantially instantaneous return of the carriage and thereby minimize loss of time between scanning strokes. This circuit is energized when the carriage assembly 75 reaches its "end of scan" position, as shown in FIG. 5, and remains energized for a brief period after the carriage is returned to its "start of scan" position, as shown in FIG. 4.

As carriage assembly 75 moves to the right from its start of scan position (FIG. 4), an offset, pendant finger 190 fixed on the carriage bears against a stud 191 in a lever 192 that is pivotally mounted on a shoulder stud 193 that is fixed in a frame plate 194. Continued movement of the carriage rotates lever 192 about its pivot until an adjustable pin 195 in the lower end of the lever contacts the actuating element 196 of an "end of scan" limit switch 7–LS that is fixed on the rearward edge of frame plate 40 of the card feeding assembly. The closing of switch 7–LS is effective to complete a circuit to energize a carriage return solenoid SOL–2 (see FIG. 5) that is fixed in the frame of the machine and has its armature connected to a lever 198 that is pivotally mounted on brackets 199 fixed on base plate 48. The upper end of lever 198 is aligned with pin 191 on lever 192 whereby, upon energization of solenoid SOL–2, lever 198 is rocked counterclockwise and is effective to rock lever 192 counterclockwise to cause pin 191 to press against finger 190 and restore the carriage assembly 75 to its "start of scan" position.

As carriage assembly 75 approaches its "start of scan" position, a first bumper element 201 (see FIGS. 5 and 6) on card guide 110 engages an actuating element 202 on an "end of scan" limit switch 8–LS that is fixed on a plate member 203 that is secured to the inner face of frame plate 41 of the card feeding assembly. Substantially simultaneously, a second bumper element 204 engages a fixed limit stop 205 that is set in plate 203. The actuation of switch 8–LS signals the return of carriage assembly 75 to its "start of scan" position and is effective, after a short delay, to initiate a repeat scan of the card on the card carriage or to effect the ejection of that card and the feeding of a new card, in accordance with the condition of the associated circuits. The slight delay period effected by switch 8–LS serves to maintain carriage return solenoid SOL–2 energized briefly to maintain pressure on the carriage, via lever 198, pin 191, and finger 190, in order to damp out oscillations of the carriage that may occur when it hits limit stop 205.

Thus, there is provided a driving mechanism for moving carriage assembly 75 throughout the scanning cycle of operation. Throughout this cycle, cam shaft 70 remains in the position shown in FIG. 5 in which followers 125, 138 and 156 of the carriage assembly actuating mechanism are opposite the low dwells of their respective cams 126, 139 and 157. Inasmuch as a slight clearance is provided between each follower and the low dwell of its respective cam, as described above, the several followers may conveniently be removed from alignment with their respective cams and then returned to proper alignment therewith during the movement of the carriage assembly, without the possibility of interference.

Optical system (FIGS. 2 and 5)

The optical system of the reproducing apparatus is effective to project a light image of the microfilm frame supported in an aperture card on the carriage assembly as it moves through the scan stroke at a magnification ratio of 15× or 20×, as desired, onto the sensitized surface of the xerographic drum.

For this purpose, the system includes a lamp housing 210 for a 500 watt, tungsten filament lamp LMP–3 and a condenser lens system 16 for concentrating the light rays from the projector lamp onto the microfilm. Lamp housing 210 is supported on a suitable standard (not shown) that is seated in a vertical bore in a boss 211 (see FIG. 5) that is formed on the rearward face of a frame member 212 supported on base casting 48. A suitable fan (not shown), driven by motor M–6, is provided for cooling projection lamp LMP–3.

The light image of the microfilm frame passes through the aperture in carriage assembly 75 and is then focused by an objective lens mounted in an adjustable lens barrel 17. Preferably, the system employs a 63 mm., $f/5.6$ lens for projecting the microfilm image. The optical axis of the system is so located that the card feeding assembly and carriage assembly can be positioned relative thereto in accordance with the size of the microfilm image to be reproduced, as described below. In any relative setting of the card feeding assembly and carriage assembly with reference to the optical axis, it is arranged that the optical axis be at the extreme right-hand edge of the microfilm image, as viewed from the front of the machine, when the carriage assembly is in its "start of scan" position.

From the objective lens, the light image is transmitted to the reflecting surface of an adjustable mirror assembly 20 whereby it is reflected upwardly to either of two mirror assemblies 21 or 22, each of which may be rendered effective to project the light image downwardly onto the surface of xerographic drum 24, in accordance with the magnification ratio employed. Mirror assembly 20 is pivotally mounted in a bracket 214 supported on the underside of plate 5 and is provided with a two-position detent mechanism 215, whereby the assembly may accurately be positioned to reflect the light image to mirrors 21 or 22. A manually settable lever 216 for positioning mirror assembly 20 projects through frame plate 5, to a position within convenient reach of the operator.

Mirror assemblies 21 and 22 extend laterally across the machine and are supported between two standards 218 that are fixed on frame plate 5. Each mirror assembly includes an optically flat reflecting element of sufficient width to reflect the entire width of the microfilm frame light image and suitable collars to support the assemblies accurately and firmly on standards 218. The upper or "20×" mirror assembly 21 is fixed in the position shown in FIG. 2 in which it is constantly in position to provide a light path to effect 20× magnification of the microfilm image. The lower or "15×" mirror assembly 21 is adjustably mounted on standards 218 whereby it may be moved into its dotted line position to effect 15× magnification of the microfilm frame light image, or to its full line position to move it out of the light path from mirror assembly 22, when 20× magnification is required. A suitable locking device 219 is provided to secure mirror assembly 21 in either of its selected positions.

The light image reflected from either mirror assembly 21 or 22 passes through a suitable opening 220 in frame plate 5 and then through a variable aperture slit assembly 23, whereby the light intensity may be controlled, before the light image reaches the surface of xerographic drum 24. Variable slit aperture 23 includes an outer housing of U-shaped cross-section that extends transversely across the machine and is secured to the underside of plate 5. Formed in the lower wall of housing 221 is a transverse slot that extends over the entire width of xerographic drum 24. In accordance with conventional projection techniques, the light slot is of varying width, being wider at each end than it is in the middle, to ensure uniform light intensity on the drum surface.

To vary the overall light intensity that reaches the drum surface, assembly 23 includes two transverse masking elements 222 and 223 that are pivotally mounted within the housing and are provided with external actuating levers whereby each may be actuated by the operator. Each masking element is provided with a suitable spring detent device whereby it may be moved to an upper or ineffective position, as shown to the left in FIG. 2, or to a downward or effective position in which it covers the slit opening in the bottom wall of the housing, as shown to the right in FIG. 2. Each masking element contains a transverse slit aperture of progressively less width than the corresponding aperture in the lower wall of housing 222. By this means, the overall light intensity projected on the drum may be varied by moving both masking elements to their ineffective position for maximum exposure, or by moving either masking element 222 or 223 into masking relation over the slot in housing 222, to decrease the exposure. Preferably, the light intensity reaching the drum through the slits in members 221, 222, and 223 is in the ratio of 4:2:1.

In order conveniently to adjust the setting of the objective lens of the system to effect proper focus in accordance with the magnification ratio employed, lens barrel 17 (see FIG. 5) is rotatably mounted, by means of a screw thread, in a base element 225 that is secured on base plate 48 and is provided with a mating thread for the screw on lens barrel 217. To facilitate the vertical adjustment of the lens, housing 17 is seated on a detent plate 226 having an upturned flanged portion to accommodate a manually settable push rod 227 that is connected at its inner end to the lens barrel. To adjust the lens for 15× or 20× magnification ratio, push rod 227 is moved bodily with detent plate 226 to the right or left, as the case may be, to the limit of the detent positions of plate 226. The action raises or lowers the lens barrel accordingly to position the lens accurately at the desired magnification ratio position. In either of such positions, push rod 227 may be pushed inwardly or pulled outwardly independently of detent plate 226 to adjust the lens setting to accommodate the particular type of microfilm being employed, i.e., whether it is "emulsion up" or emulsion down."

*Card feed-optical system adjustment (FIGS. 4 and 5)*

Although the aperture in microfilm cards currently in commercial use are constant in size, the actual usable image area varies in accordance with the size of the original and the reduction ratio used in making the microfilm frame. For all practical purposes, the maximum length of the image in a microfilm card is defined by the size of the opening in the adhesive used to secure the film to the card. This dimension is usually 1⅝". On this basis the xerographic reproducing system disclosed herein is designed to accommodate film widths up to 1¾", and the amount of carriage assembly travel during the scanning stroke is limited accordingly. When the longest length of scan is used, a portion of the microfilm image at either end is covered by the relatively transparent adhesive that secures the microfilm frame to the card, thereby resulting in some loss of image quality in the extreme ends of the frame. However, this permits the use of larger images when that is required.

When a large number of images is to be reproduced that are less than the full size of the average or normal card aperture, it is desirable to reduce the length of the scan to correspond to the overall length of the microfilm image in order to minimize wastage of transfer material and in order to reduce the time required for making the reproductions. In the present system it is possible to vary the length of scan in accordance with the length of the microfilm by moving the entire card feeding assembly relative to the axis of the optical system.

The waste space between successive prints on a web of transfer material is determined by the amount of time required to effect a carriage return and card change, or, in the case of a repeat scan, the time required to return the carriage and restore the scan drive. By returning the carriage in the manner described above, it is possible to restore the carriage and condition it to initiate a repeat scan stroke in approximately ⅛ of a second. Inasmuch as the xerographic drum and transfer material web are traveling at a rate of 20 feet per minute, this results in a space between prints of approximately ½". When a card change is required in addition to the carriage return, an additional ¼ second is required so that the total waste space on the transfer material in this condition amounts to approximately 1½". Although these figures are obviously well within the limits of operating convenience, it is apparent that it is highly desirable to reduce scan time and waste of transfer material whenever possible by decreasing the length of the scanning stroke.

As a matter of practice, all microfilm frames employed in making microfilm cards are positioned in a manner to center the microfilm image within the microfilm card aperture. For this reason, any change in the start of scan position requires a corresponding change in the end of scan position. By means of the arrangements thus far disclosed, it is possible to adjust both the start of scan and the end of scan positions by means of a single manual setting.

As pointed out above, when carriage assembly 75 is returned to its start of scan position, it is stopped by a limit stop 205 that is mounted on a plate 203 fixed on card feeding assembly frame plate 41. Thus, the starting position of the carriage varies in accordance with changes in the position of the card feeding assembly. In addition, the end of scan switch 7–LS is mounted on the card feeding assembly and moves therewith. Since this movement is in the opposite direction to that required, the invention includes the particular arrangement of lever 192 whereby a center pivot 193 is introduced between switch 7–LS and finger 190 on carriage assembly 75 in order to reverse the motion. By this means, as the start of scan position is altered, a corresponding change in end of scan position occurs.

In adjusting the scan length it is necessary for the operator to know where to position the card feeding assembly for the particular film to be used. For this purpose there are provided a viewing device to enable the operator visually to observe directly on the microfilm frame the length of scan for which the apparatus is set, and means manually to adjust the position of the card feeding assembly, and thereby the start of scan position, relative to the optical axis.

For adjusting the position of the card feeding assembly relative to the axis of the optical system, frame plate 41 (FIGS. 4 and 5) of the card feeding assembly is provided with a pendant extension secured thereto that has a hole in its lower end. In addition, a lateral extension 231 is secured on base plate 48 and is provided with a tapped hole aligned with the hole in member 230. An adjusting screw 232 is threaded into member 231 and is provided with an enlarged shoulder portion 233 that bears against member 230. A compression spring 234 is arranged on the shank of screw 232 between members 230 and 231. By the combined action of screw 232 and spring 234, the entire card feeding assembly can be moved laterally, with respect to the axis of the optical system, by adjusting the position of knife edge member 43 on rollers 44 and 45. By this means, the start of scan position and end of scan position may be adjusted at will.

In order to determine precisely the amount of adjustment required for any given card or set of cards, a card image viewing device 235 (see FIG. 4) is secured on base plate 48 in spaced relation to the outer face of frame plate 40 of the card feeding assembly. The viewing device includes a light box having a glass top 236 and a transparent plastic guide plate 237 spaced sufficiently therefrom to permit the insertion of a microfilm card between the glass top and the guide plate. An index line 238 is engraved on the underside of guide plate 237. A microswitch actuating element 239 is arranged to be operated by a card placed in viewing position to close a mircoswitch 10–LS to complete a circuit to a lamp LMP–4 within the viewing device, to facilitate visual observation of the microfilm frame.

In use, a microfilm card is inserted under guide plate 237 and is pushed against the outer face of frame plate 40 of the card feeding assembly. The several parts are so arranged that the point at which index line 238 intersects the microfilm frame in the card aperture defines one end of the scan travel and, since the image is centered in the card aperture, defines the area to be scanned. To set the mechanism for the proper scan length, the edge of the card is held against plate 40 and screw 232 is rotated to move the card feed assembly until index line 238 is positioned on the microfilm frame at the point at which it is desired to start scanning the image thereon. When this adjustment is made, the card used for the adjustment and others having a similar image area may be reproduced with a minimum waste of transfer material and a maximum utilization of available scanning time.

*Operation of the card handling mechanism*

The function of the card handling mechanism is to position each individual card in the optical path, pass it at the proper speed past the lens, return it for the desired number of repeat copies, if required, and, finally, to reject the card and position the following card. During scan each card lies in a horizontal plane and the light source projects a light beam vertically downward onto the microfilm image and then downward through the lens onto a mirror positioned below the lens, at which point the beam is deflected upward, at an angle determined by the magnification selected, onto one of two mirrors, which then reverses the beam and projects it vertically downward onto the xerographic drum.

In the description to follow it is assumed that the manual switches will be set to Head Automatic, Card, and 15×. The operation of the xerographic portion of the system is considered only when it is necessary to an understanding of the card handling mechanism.

For simplicity of description it is assumed that the machine is already in operation, with a card on the carriage being scanned. Operation during the starting period is described below.

For card operation, the following components operate continuously: the projection lamp, the lamp cooling blower, the card feed roll drive motor, the scan drive motor, and the cam shaft drive motor. Referring to the wiring and timing diagrams, during the scanning operation solenoid SOL–5 the 15× scan drive solenoid is energized and the carriage is driven at constant speed by the 15× scan drive roller. At the end of the scan the finger on the carriage operates the end of scan switch (7LS). When 7LS closes at the end of scan, power from wire 53 is fed through the normally closed contact of relay 3CR to wire 60. Wire 53 is energized at all times during the operation of the head, and serves as a power source for the relays and solenoids in the control section.

It is assumed that the counter is set to produce more than one copy, and in the case being considered the counter has not reached a total count. With power applied to wire 60, relays 5CR and 6CR are energized. Relay 5CR, the carriage return relay, is maintained after its initial operation through contact 5CR–1A. Contact 5CR–1B interrupts the circuit to solenoid SOL–5, which releases the friction drive to the carriage to permit its return without interference with the scan drive. Contact 5CR–2 closes and energizes solenoid SOL–2, the carriage return solenoid. This solenoid then operates and returns the carriage to the start scan position in approximately 1/8 of a second.

As soon as the carriage starts its return movement, SW7–LS again opens. However, relays 6CR and 5CR remain operated through contact 5CR–1A. The counter coils 4TR count, and 4TR clutch have been energized continuously during scan through the normally closed contacts of 6CR. On the operation of relay 6CR contact 6CR–1 and 6CR–2 open the circuit to the counter coils and a count is registered by the counter. The counter operation is such that a count is registered each time the circuit to the coil is interrupted, rather than when the coil is energized.

The operation of the counter is as follows: When power is first applied to the coils of the counter, the clutch coil operates the contacts of the counter, closing contact 4TR–1 and opening contacts 4TR–2 and 4TR–3. When power is removed from the coils a single count is registered by the count coil. The clutch coil is maintained continuously by the closed contact 4TR–1. Each succeeding application and removal of power to the coils registers and additional count until the full number of counts has been achieved. Upon removal of power after the final count the clutch coil is de-energized by the counter mechanism, and contact 4TR–1 opens and contacts 4TR–2 and 4TR–3 close. Thus, contacts 4TR–2 and 4TR–3 are closed only during the interval from the removal of power on the final count of a cycle to the application of power on the next count.

Since a card repeat is being considered in this example, the operation of relay 6CR results in a count being registered by the counter upon the opening of contact 6CR–1. Contact 6CR–2, although it opens at this time, has no effect since contact 4TR–1 is closed.

When the carriage reaches the start scan position SW8–LS is operated by the carriage. Relay 7CR then operates. Relay 7CR is adjusted so that it requires 30 to 40 milliseconds to operate, providing a slight time delay beween the time when the carriage returns and the relay contacts open. By means of this delay the carriage return solenoid continues to apply force against the carriage when it strikes the stop at the start scan position to minimize the tendency of the carriage to bounce away from the stop due to the impact.

When relay 7CR operates contact 7CR–1 opens, and the circuit to relays 5CR and 6CR is interrupted, releasing both relays. Contact 7CR–2 has no effect at this time, since contact 4TR–2 is open. When relay 5CR releases contact 5CR–1A opens, and the relay will not again operate when 7CR–1 again closes. Solenoid SOL–2, the carriage return solenoid, is de-energized by the opening of contact 5CR–2, and the scan drive solenoid is energized by the closing of contact 5CR–1B and the scanning operation is again resumed. Contacts 6CR–1 and 6CR–2 closed upon the release of relay 6CR, and power is again applied to the 4TR count coil.

Assume now that the counter has reached a full count, and a card change is to take place. At the end of scan SW7–LS closes, applying power to relays 5CR and 6CR. Relay 5CR operates and holds through contact 5CR–1A. Contact 5CR–1B opens and interrupts power to the scan drive solenoid. Contact 5CR–2 closes and applies power to the carriage return solenoid and the carriage is returned to the start scan position. Relay 6CR operates and contacts 6CR–1 and 6CR–2 open. The final count is registered and clutch coil 4TR is de-energized, contact 4TR–1 opens and contact 4TR–2 and 4TR–3 close.

When the carriage reaches the start of scan position, SW8–LS is closed and power is applied to relay 7CR and also to the single revolution clutch solenoid, solenoid SOL–3, through contacts 7CR–2 and 4TR–2, both of which are now closed. Solenoid SOL-3 operates and releases the trip lever of the single revolution clutch, and the cam shaft begins a revolution. After a 30 millisecond delay, contact 7CR-1 opens. Since it is now shunted by closed contact 4TR-3 there is no effect. Contact 7CR-2 also opens, and interrupts the circuit to solenoid SOL-3. The solenoid is de-energized, and the trip lever returns to its normal position. The cam shaft will continue to revolve but will be interrupted at the end of one revolution by the stop lever. Since the opening of contacts 7CR-1 did not interrupt the hold circuit for relays 5CR and 6CR, the carriage return solenoid continues to hold the carriage against the stop, assuring its proper location with respect to the feeder, so that a card may be fed to the carriage.

As the cam shaft revolves, the line-up fingers are depressed below the carriage level, by their actuating cam; the pressure pad is raised from the carriage to release pressure and permit card movement; and the ejector pins move forward to push the card on the carriage into the mating lower feed rolls, where it is ejected into the card receiver. Simultaneously the pickerknife crank operates the pickerknife, pushing the bottom card of the stack into contact with the upper feed rolls and the card is carried through the rolls and deposited on the carriage. The ejector pins are retracted before the card arrives on the carriage, so there is no interference. The line-up fingers swing back into position to position the card against the back edge of the carriage. Side positioning is accomplished by fixed side flanges on the carriage. The pressure pad now moves downward to clamp the microfilm to the glass insert in the carriage, to insure film flatness during the scan stroke.

As the card passes through the upper card feed rolls it operates the card detector switch, 6LS, opening the contact. Simultaneously the miss detector switch 5LS is contacted by the pickerknife crank cam, and contacts 5LS are closed. Assuming that a card is fed at the proper time, operation will continue. If a card fails to fed, either due to mechanical difficulties, or lack of cards, the card detector switch will not operate, and the miss detector switch on closing will then apply power to relay 3CR, which initiates the stop cycle, described below. Near the end of the cam shaft's revolution, switch 9LS is operated. This switch, which is normally closed, will then be opened and the entire circuit for relays 5CR and 6CR will be interrupted. The opening of contact 5CR-1A prevents reoperation of the relays. Contact 5CR-2 opens and solenoid SOL-2 is de-energized. Contact 5CR-1B closes and solenoid SOL-5 is energized, and scan drive is again resumed.

The normal stopping operation is arranged to ensure delivery of completely fused prints of all material exposed up until the time of the stop. During card operation, provision is also made to provide a complete print of the last image regardless of when the stop operation is initiated. When the stop switch SW-3 is depressed momentarily, power is applied to relay 3CR. Contact 3CR-2 closes, and the circuit is maintained. Contact 3CR-1A now closes and contact 3CR-1B opens. At the end of scan, "end of scan" switch 7LS closes, and power is now applied to relay 4CR. Relay 4CR operates, and contact 4CR-2A closes and maintains the circuit. Contact 4CR-2B opens, removing power from the projection lamp and the 4 motors.

Operation of the card handling mechanism is now stopped, but the xerographic portion of the machine continues to operate. Contact 4CR-1A closes, upon the operation of 4CR, and timer 1TR is energized. Contact 4CR-1B opens and the conveyor drive motor, motor 5, is stopped. Sufficient developer is maintained in the upper chamber of the developer conveyor to provide developer flow for a sufficient time to develop the exposed section of the drum which remains. When the developer supply is fully depleted the cleaning brush continues to operate, so that the drum will be clean by the time the machine stops. After approximately 18 seconds of operation, TR1 opens a circuit to the main contactor and the remainder of the machine comes to a stop.

When the machine is started with SW-11 in the "head automatic" position, power is applied to wire 13 by the closing of contact 1CR-4, immediately upon depressing the run button. Since contact 4CR-2B is normally closed, power is immediately applied to the projection lamp and the fan, card, clutch, and scan motors. Power is also applied to timer 3TR, and after a delay of approximately 1½ seconds contact 3TR closes applying power to wire 53. If the machine has been stopped through the use of the normal stop procedure, the carriage will be at the end of scan position and SW-7LS will be closed. Since the counter is de-energized at this time contacts 4TR-2 and 4TR-3 are closed, and therefore, a card change will take place immediately. Timer 5TR has been provided to open the circuit to the 4TR clutch coil until the first card change has taken place to prevent the possibility of a brief pulse reaching the clutch coil before relay 6CR operates. After closing, 5TR remains closed continuously during operation. When contact 3TR closes on starting, power from wire 53 is applied through SW-7LS to wire 60, and the operation is as described above for a card change operation.

If the operator wishes to make copies of the card on the carriage, rather than feeding in a new card on starting, he can do so by manually moving the carriage to the start scan position before depressing the run button. If this is done, scanning will start on the closing on contact 3TR, and a full count cycle will be completed before a card change takes place. This type of operation would be necessary if the machine were to be stopped before a full number of copies had been made, when making multiple copies. The counter has no provision for storing a partial count, and returns to the start of a count cycle when the machine is stopped. If, for example, the counter were set to produce 10 copies of each print and the machine were to be stopped after only 5 copies had been made, the final set of prints would be short by that amount if the normal starting procedure were followed.

For carrying out service work on the head SW-11 has been provided which permits operation of the head without operation of the xerographic portion. When this switch is thrown to the "head only" position, operation of the head is the same as in the "head automatic" position, and the normal stop switch is to be used for stopping the operation. After the head stops it is necessary to return the switch to the center "off" position to remove power from the stop relays. This switch must be returned to the "off" position in order to restart the operation of the head in the "head only" position. It is, of course, necessary to return this switch to the "head automatic" position at the completion of the service operation to achieve full normal automatic operation.

To switch the operation of the head from one magnification ratio to the other, four operations are necessary. Manually operated toggle switch SW-13 is thrown to the desired magnification ratio, as indicated, connecting the proper scan drive solenoid for use. The lower pivoting mirror is moved from one position to the other by means of a knob on the top plate of the head. The large lower mirror is moved into and out of position by means of a pull knob projecting from the head covers. The lens focus is adjusted by moving the lever to the appropriate position.

*Developing system (FIG. 2)*

In order to effect development of the electrostatic latent image formed on the xerographic drum, the invention includes an improved developing system that is particularly adapted to effect uniform and consistent development, regardless of drum width, and is specially suited to effect development on the 24" wide drum employed on the xerographic reproduction apparatus disclosed herein. In addition, the developing system is structurally arranged to facilitate maintenance thereof and to permit ready access to the xerographic drum for periodic cleaning.

As mentioned above, the entire developing system is contained in end section 3 of the apparatus that is formed of a plurality of sheet metal plates that are integrally connected to provide a completely dust-tight housing and are arranged to be mounted on hinges fixed on base section 1 so that the entire developing system may be swung outwardly from the machine to afford access thereto and to the xerographic drum.

In prior xerographic processing devices, it was customary to provide a developing system having a vertical conveyor apparatus to transport developing material from a collecting point to a system of chutes whereby the material could be directed into contact with the xerographic drum. In such devices the vertical conveyor usually included relatively narrow conveyor buckets which necessitated lifting the developing material to a substantial height and then distributing it through an elaborate chute system in order to effect proper developing material distribution on the drum surface. In the present invention the vertical conveyor system includes relatively wide buckets that are arranged parallel to the xerographic drum axis and have a transverse length approximately equal to three-quarters of the width of the drum surface.

In the specific arrangement shown, the conveyor system includes a plurality of transverse buckets 246 that are horizontally supported between two endless belts 247 on opposite sides of the developer system housing and extend over pulleys 248 and 249 that are fixed respectively on transverse shafts 250 and 251. For actuating the conveyor system, upper shaft 250 is driven through a belt 252 by a motor M-5 that rotates constantly while the machine is in operation.

The developing material conveyed upwardly by the conveyor system is discharged into an inclined plate 253 that extends transversely across the entire developing system structure, and extends downwardly to a point at which it forms a transverse slit orifice in conjunction with a sheet metal plate 254 of the developer system housing. The slot formed by plates 253 and 254 is of sufficient width to permit an adequate flow of developing material into contact with the xerographic drum surface, but is sufficiently narrow to impede the progress of the developing material and cause it to back up on plate 253 to form a substantial reserve of developing material while the machine is in operation. Thus, since rate of developer flow is a function of slot width rather than head of material, a uniform flow of developing material is maintained at all times. For convenience of maintenance, an access door 255 is hinged in an aperture in plate 253 and, together with plate 253, forms a substantially continuous surface for transporting developing material.

To minimize undesired bouncing of the developing material within the system, a curved baffle plate 256 is secured along the lower edge of plate 253 and extends transversely across the machine in spaced relation to the xerographic drum. The spacing is such as to permit complete freedom of movement of the developing material between the plate and the xerographic drum, and the outward curve of plate 256 is effective to guide substantially all of the developing material downwardly onto an inclined transverse plate 257, whereby the developing material is guided into a collecting bin 258 formed by the cover plates of the apparatus wherein it may conveniently be scooped by conveyor buckets 246.

In order to limit the mount of developing material in collecting bin 258, the apparatus includes a catch baffle plate 259 that extends transversely across the entire developing system housing and has its lower edge spaced from the surface of plate 257 to control the flow of developing material into the collecting bin. By this arrangement the amount of developing material in bin 258 cannot exceed the height of the lower edge of baffle 259. Developing material in excess of this level backs up on the incline of plate 257 and is contained by the vertical face of baffle plate 259 to replace the developing material removed from bin 258 by buckets 246. By this means it is possible to keep a substantially constant supply of deveolping material in the collecting bin and to maintain a substantially constant load on the conveyor system.

In order to replenish the developing material with toner particles as these are expended in the formation of xerographic powder images, the apparatus includes a toner dispensing mechanism 260 that is disclosed in detail and claimed in my copending application Serial No. 776,976, filed November 28, 1958. Toner dispenser 260 is supported on a suitable bracket 261 in the developing system housing, and is driven from shaft 250 via belt 262, pulley assembly 263 and belt 264.

In operation, the toner dispenser functions to sift toner material onto the developing material that has cascaded over the xerographic drum surface. In order to ensure uniform distribution of new toner, the toner dispenser extends horizontally substantially across the drum surface and functions to distribute a uniform flow of toner particles throughout its entire width, in accordance with the dispensing rate required.

To ensure adequate mixing of the toner particles with the developing material, at least a portion of them are caused to deposit on curved baffle plate 256. To cause these particles to be mixed with the remaining developing material, a narrow slot is formed in access door 255 on guide plate 253 whereby a portion of the material supported by plate 255 is caused to pass through the slot and over the surface of plate 256 thereby flushing the toner particles into the developing material supply at the bottom of the housing.

*Fusing assembly (FIG. 12)*

For affixing xerographic powder images permanently to the transfer material web, the apparatus includes an improved heat fusing apparatus. This apparatus, schematically designated by reference character 32 in FIG. 2, is disclosed in complete detail in FIG. 12. Preferably, it constitutes a unitary structure that may be removed from or inserted in the xerographic reproduction apparatus independently of other equipment and, when so inserted, be available immediately for operation.

For supporting the fusing assembly in the xerographic reproduction apparatus, there is provided a framework that is permanently secured between the side frames of the apparatus. This framework includes two inverted channels 270 that are fixed in the frame of the machine and are provided with turned-over flange portions for engaging a plurality of T-bolts 271 which, in turn, are employed to support and position four hanger members 272. Fixed to hangers 272, on either side of the machine, are longitudinal rail members 273 that are spaced apart and formed into a rigid frame structure by lateral channel members 274. The members described thus form a rigid open framework for supporting the fuser assembly.

The fuser assembly per se is mounted in an open, rectangular aluminum frame member 275. Fixed on the front and rear faces of frame member 275, as viewed in FIG. 12, are flange members 276 that extend over the upper edge of the frame member and serve to secure the heat shield 277, whereby the remaining mechanism of the system is protected from direct radiation from the fuser coils. A vent hole 278 is formed on the upper face of the heat shield and is connected through a suitable exhaust duct (not shown) to remove excess heated air and fumes from the region of the fuser assembly.

Mounted on the upper faces of the front and rear rails of fuser frame 275 is an aluminum reflector element 279 in which are supported a plurality of porcelain insulating hanger members 280 which, in turn, support a plurality of Nichrome resistance elements 281 that are energized, by suitable circuitry, to radiate sufficient heat to fuse the thermoplastic material of xerographic powder images to the transfer material at its passes therebeneath.

For conveniently positioning the fuser assembly in the machine, rollers 282 are mounted at each of the corners of fuser frame 275 and are arranged to roll on rail members 273. In addition, handle assemblies 283 are fixed to the forward rail of fuser frame 275. Fixed on the rear rail of the fuser frame, with suitable insulating means, is a three-pound electrical plug 284 that is positioned to engage a mating connection 285 fixed in the frame of the machine. By this arrangement, it is apparent that the entire fuser assembly may conveniently be inserted and removed from the machine merely by manipulation of handle assemblies 283.

To ensure even heating of the entire surface of a web of transfer material that passes under the heater, heating coils 281 are set at a slight angle to the longitudinal path of movement of the paper web. The spacing of the several coils is such that the rear end of each coil is longitudinally aligned with the front end of the next adjacent coil. By this arrangement, each incremental area of the transfer material web is caused to receive substantially the same degree of radiation.

Whereas, the several mechanisms that constitute the present invention are described in complete detail in conjunction with a xerographic processing apparatus with which they are particularly adapted to function, it may be noted that the wiring diagram (FIG. 14) includes certain elements that are not specifically discussed above. A description of these elements is omitted because it is not essential to an understanding of the invention. For example, switches LS–1 and LS–2 are merely safety interlock controls that function to prevent the operation of the machine in the event the several access doors are not closed before operation is started. They also serve to stop the machine if such doors are opened while the machine is in operation. Switches LS–3 and LS–4 also serve to stop the operation of the machine in the event of excessive tension or a break in the web of transfer material. In addition, certain of the elements of the circuit are not described in detail because these are commercially available items that are used in their purchased form. For example, the automatic pre-settable counter 4–TR is preferably of the type identified as a Microflex Reflex Counter—HZ Series—manufactured by the Eagle Signal Corporation of Moline, Illinois; the single revolution clutch 166 is preferably of the type identified as a Size 1 Clutch, manufactured by the Hilliard Corporation of Elmira, New York; and the timer 3–TR, which is employed to effect approximately a two-second delay between the pushing of the start button and the energization of the several operating circuits, is preferably of the type identified as a 5901–1 Adjustable Reset Timer, manufactured by the Haydon Corporation of Torrington, Connecticut.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. In a microfilm card utilization apparatus the combination of means for feeding microfilm cards seriatim, an optical scanning system for scanning the microfilm card images, the optical axis of the scanning system being offset from the path of movement of cards fed by the card feeding means, means for receiving cards from the card feeding means and being movable between said path and said optical axis along a line therebetween.

and means to adjust the relative positions of the scanning system and the card feeding means along said line to vary the offset distance along said line between the optical axis of the scanning system and the path of movement of cards fed by the card feeding means.

2. In a microfilm card utilization apparatus the combination of means for feeding microfilm cards seriatim, an optical scanning system for scanning the microfilm card images, the optical axis of the scanning system being offset from the path of movement of cards fed by the card feeding means, means for receiving cards from the card feeding means and being movable between said path and said optical axis along a line therebetween.

means to adjust the relative positions of the scanning sytem and the card feeding means along said lines to vary the offset distance along said lines between the optical axis of the scanning system and the path of movement of cards fed by the card feeding means.

and means to control the amount of such adjustment as function of the size of the image on the microfilm card.

3. In a microfilm card utilization apparatus the combination of means for feeding microfilm cards seriatim, means for storing the microfilm cards in stacked arrangement after they have been utilized, a card scanning system for scanning information contained on the microfilm cards, said scanning system being offset from the path of movement of the card feeding means, said feeding means including a transfer mechanism for moving cards into said storing means after they have been scanned, means for receiving cards from the card feeding means, and means for moving the card receiving means normally to the path of movement of the card feeding means and into operative relation with the card scanning system, said last named means being adapted to move the card receiving means back to said path of movement of the card feeding means after scanning of the cards to permit movement of the cards into card storing means by said transfer mechanism.

References Cited by the Examiner

UNITED STATES PATENTS

| 2,406,299 | 8/1946 | Koulicovitch | 250—219.4 |
| 2,673,487 | 3/1954 | Bumstead | 88—24 |
| 2,788,705 | 4/1957 | Huebner | 88—24 |
| 2,928,953 | 3/1960 | Bassler | 250—219.1 |

ROBERT C. BAILEY, *Primary Examiner.*

MALCOLM A. MORRISON, *Examiner.*